(12) United States Patent
Todd et al.

(10) Patent No.: US 10,209,892 B2
(45) Date of Patent: Feb. 19, 2019

(54) STORAGE OF FORMAT-AWARE FILTER FORMAT TRACKING STATES

(71) Applicant: HEWLETT PACKARD ENTERPRISE DEVELOPMENT LP, Houston, TX (US)

(72) Inventors: Andrew Todd, Bristol (GB); David Malcolm Falkinder, Bristol (GB); Ieuan James Henry, Bristol (GB); Alastair Slater, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 254 days.

(21) Appl. No.: 15/361,939

(22) Filed: Nov. 28, 2016

(65) Prior Publication Data

US 2018/0150236 A1 May 31, 2018

(51) Int. Cl.
*G06F 3/06* (2006.01)

(52) U.S. Cl.
CPC ............ *G06F 3/0608* (2013.01); *G06F 3/065* (2013.01); *G06F 3/067* (2013.01); *G06F 3/0641* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 6,161,111 A * | 12/2000 | Mutalik | G06F 3/0619 705/42 |
| 7,363,359 B1 | 4/2008 | Tripathy et al. | |
| 7,519,635 B1 | 4/2009 | Haustein et al. | |
| 7,539,710 B1 | 5/2009 | Haustein et al. | |
| 7,725,437 B2 | 5/2010 | Kirshenbaum et al. | |
| 7,925,683 B2 | 4/2011 | Jain et al. | |
| 8,046,509 B2 | 10/2011 | Bondurant | |
| 8,214,517 B2 | 7/2012 | Dubnicki et al. | |
| 8,380,681 B2 | 2/2013 | Oltean et al. | |
| 8,645,335 B2 | 2/2014 | Gupta et al. | |
| 8,660,994 B2 | 2/2014 | Slater et al. | |
| 8,935,487 B2 | 1/2015 | Sengupta et al. | |
| 8,990,171 B2 | 3/2015 | Kalach | |
| 9,053,032 B2 | 6/2015 | Sengupta et al. | |
| 9,405,763 B2 | 8/2016 | Prahlad et al. | |
| 9,432,704 B2 | 8/2016 | Mutton | |

(Continued)

OTHER PUBLICATIONS

El-Shimi et al., "Primary Data Deduplication—Large Scale Study and System Design," 2012, 2012 USENIX Annual Technical Conference (USENIX ATC 12), <https://www.usenix.org/system/files/conference/atc12./atc12-final293.pdf>.

(Continued)

*Primary Examiner* — Charles Rones
*Assistant Examiner* — Hewy H Li
(74) *Attorney, Agent, or Firm* — Hewlett Packard Enterprise Patent Department

(57) ABSTRACT

Examples include the storage of format-aware filter format tracking states. Some examples include storage of a format tracking state for a format aware filter in a backup system in association with a backup object, access of the format tracking state from the backup system in response to detection of a potential continuation of a backup image, and applying the format-aware filter using the accessed format tracking state.

15 Claims, 4 Drawing Sheets

(56) References Cited

U.S. PATENT DOCUMENTS

| | | | |
|---|---|---|---|
| 9,600,200 B1 * | 3/2017 | Wallace | G06F 3/0641 |
| 2004/0039820 A1 | 2/2004 | Colby et al. | |
| 2006/0059171 A1 | 3/2006 | Borthakur et al. | |
| 2009/0037500 A1 | 2/2009 | Kirshenbaum | |
| 2010/0082774 A1 | 4/2010 | Pitts | |
| 2010/0306412 A1 | 12/2010 | Therrien et al. | |
| 2011/0265083 A1 | 10/2011 | Davis | |
| 2012/0036319 A1 | 2/2012 | Bondurant | |
| 2012/0158671 A1 * | 6/2012 | Tzur | G06F 17/30156 707/692 |
| 2012/0166448 A1 | 6/2012 | Li et al. | |
| 2013/0054544 A1 | 2/2013 | Li et al. | |
| 2013/0212074 A1 * | 8/2013 | Romanski | G06F 12/0253 707/692 |
| 2013/0339643 A1 | 12/2013 | Tekade et al. | |

OTHER PUBLICATIONS

Eshghi et al., "A Framework for Analyzing and Improving Content-Based Chunking Algorithms," Sep. 22, 2005, <http://shiftleft.com/mirrors/www.hpl.hp.com/techreports/2005/HPL-2005-30R1.pdf>.

Fu et al., "AA-Dedupe: An Application-Aware Source Deduplication Approach for Cloud Backup Services in the Personal Computing Environment," 2011, 2011 IEEE International Conference on Cluster Computing, <https://pdfs.semanticscholar.org/ee48/23df6e55a8a42a18636f46b23f5988966a33.pdf>.

Fu et al., "Application-aware local-global source deduplication for cloud buckup services of personal storage," 2014, IEEE Transactions on Parallel and Distributed Systems 25.5 (2014), pp. 1155-1165, <https://www.researchgate.net/publication/261567175_Application-Aware_Local-Global_Source_Deduplication_for_Cloud_Backup_Services_of_Personal_Storage>.

Hewlett-Packard Development Company, L.P.. "Understanding the HP Data Deduplication Strategy," May 2008, < https://s3.amazonaws.com/files.technologyreview.com/p/pub/legacy/4aa1-9796enw.pdf>.

Lin et al., "Metadata is Harmful to Deduplication," 2015, <https://www.cs.utah.edu/~xinglin/papers/hotstorage15-poster.pdf>.

Lin et al., "Metadata Considered Harmful . . . to Deduplication," 2015. 7th USENIX Workshop on Hot Topics in Storage and File Systems (HotStorage 15), <https://www.usenix.org/system/files/conference/hotstorage15/hotstorage15-lin.pdf>.

Liu et al., "ADMAD: Application-Driven Metadata Aware Deduplication Archival Storage System," 2008, Fifth IEEE International Workshop on Storage Network Architecture and Parallel I/Os. <htlp://citeseerx.ist.psu.edu/viewdoc/download?doi.10.1.1.712.363&rep=rep1&type=pdf>.

Lu et al., "Frequency Based Chunking for Data De-Duplication," 2010, 2010 IEEE International Symposium on Modeling, Analysis and Simulation of Computer and Telecommunication Systems, <https://pdfs.semanticscholar.org/9b6d/f30a4ad0cfc03ffa0602f72801119076b800.pdf>.

Philipp C. Heckel, "Deduplication," Minimizing remote storage usage and synchronization time using deduplication and multichunking: Syncany as an example, May 20, 2013, Thesis, Ch. 3., <https://blog.heckel.xyz/2013/05/20/minimizing-remote-storage-usage-and-synchronization-time-using-deduplication-and-multichunking-syncany-as-an-example/3/#Chunking-Methods>.

S. Meghana, "An Application Awareness Local Source and Global Source De-Duplication with Security in resource constraint based Cloud backup services," International Journal of Computer Science and Information Technologies (IJCSIT), vol. 7 (4), Aug. 2016, pp. 2108-2112. <http://ijcsit.com/docs/Volume%207/vol7issue4/ijcsit2016070494.pdf>.

Venish et al., "Study of Chunking Algorithm in Data Deduplication," Proceedings of the International Conference on Soft Computing Systems, Springer India, Nov. 3, 2016, <http://www.springer.com/cda/content/document/cda_downloaddocument/9788132226727-c2.pdf?SGWID=0-0-45-1545414-p177747103>.

Wikipedia, "Data deduplication," Oct. 24, 2016, <https://en.wikipedia.org/w/index.php?title=Data_deduplication&oldid=745968238>.

Wikipedia, "Filter (software)," May 26, 2016, <https://en.wikipedia.org/w/index.php?title=Filter_(software)&oldid=722204508>.

* cited by examiner

STORAGE OF FORMAT-AWARE FILTER FORMAT TRACKING STATES

BACKGROUND

A computer system may store data in local storage of the computer system. In some examples, the data may also be stored in a remote data backup system that is in communication with the computer system. In such examples, the data may be retrieved from the data backup system when the data is lost, corrupted, or otherwise becomes inaccessible at the local storage of the computer system, for example.

BRIEF DESCRIPTION OF THE DRAWINGS

The following detailed description references the drawings, wherein.

DETAILED DESCRIPTION

Figure 1:
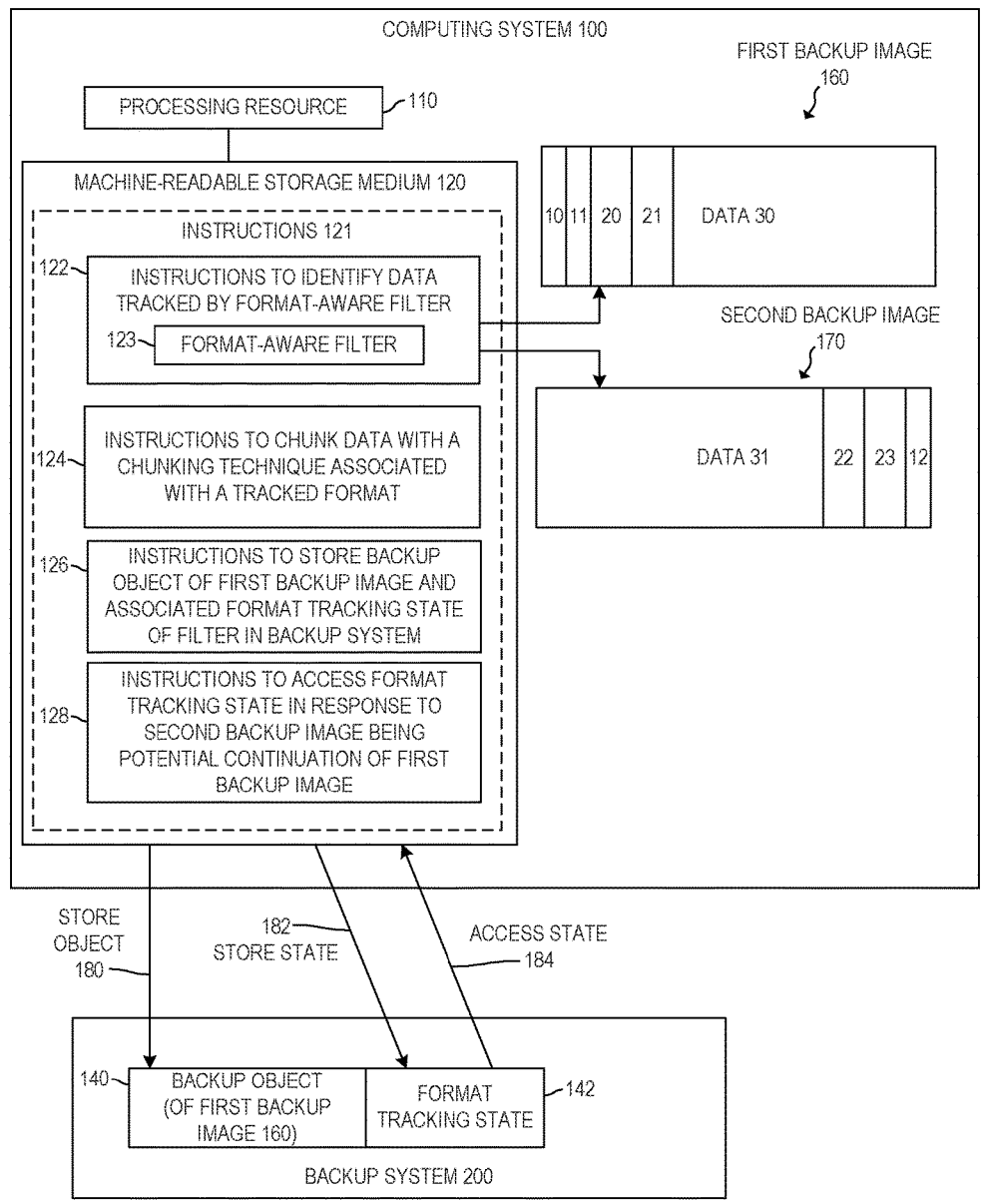
FIG. 1 is a block diagram of an example computing environment including a computing system to store a format tracking state of a format-aware filter in a backup system.

A collection of data may be deduplicated for storage in a computer storage system in order to store the data using less space than would be occupied by the full data in non-deduplicated form. In some examples, a process of deduplication performed on a collection or "stream" of data may include breaking the stream into portions (referred to herein as "chunks"), identifying duplicate chunk(s) of the stream (e.g., chunks having content identical to the content of chunk(s) of the stream or a previous stream, etc.), storing one (full or compressed) copy of each duplicate chunk, and storing references to that one copy of the chunk for each duplicate of that chunk (i.e., each chunk including the same content). In this manner, a deduplication process may avoid storing "duplicate" copies of chunks of a stream of data (or "data stream"), and instead store a single copy of data content that is identified as having duplicates in the stream.

The amount of deduplication achieved by a system may be impacted by the manner in which the data is divided into chunks (i.e., "chunked"), as similar streams chunked similarly may lead to identification of more duplicate chunks than when similar streams are chunked differently, for example. As such, some systems may apply particular chunking techniques to data based on the format of that data (e.g., applying a fixed block chunking technique with a particular chunk size to data of a particular type of database format, etc.). In such examples, the system may rely on headers (or other indicia) at the beginning of a data stream to identify the format of the data. However, some streams may be received for deduplication as a series of separate fragments, such as when the entire data stream to be backed up is quite large. In such examples, a first fragment may start with header(s) or other information usable to identify data format(s) for the data in that fragment, while later fragments may not begin with such headers or information. As such, it may be difficult to identify data formats in the later fragments received separately and apply appropriate chunking techniques for better deduplication gains. Similarly, the fragmentation of the data stream may make it difficult to track the data formats and content types through an entire data stream since the stream is received in separate pieces for processing, which may also make it difficult to apply desired chunking techniques.

To address these issues, in examples described herein, format-aware filters may be used to track data formats over a stream of data to apply different chunking techniques to different types of content, and format tracking states of the format-aware filters may be persisted in a backup system such that filter processing may be resumed when processing a later fragment that is a continuation of a prior fragment. For example, examples described herein may identify data of a first backup image having a format tracked by a format-aware filter, and store, in a backup system, a backup object representing the first backup image and a format tracking state of the format-aware filter. In response to a determination that a second backup image is a potential continuation of the first backup image, examples described herein may access the stored format tracking state, identify further data of the tracked format in the second backup image by applying the given format-aware filter using the given format tracking state accessed from the backup system, and chunk the identified further data with a chunking technique associated with the tracked format.

In this manner, in examples described herein, a format tracking state of a format-aware filter that is current at the end of processing one backup image (e.g., a stream fragment) may be persisted in a backup system so that the format-aware filter may resume its processing with the stored format tracking state when processing another backup image (e.g., a later stream fragment) determined to be a continuation of the prior fragment. In such examples, an appropriate format-aware filter may continue tracking a data format in separate stream fragments, where the filter may not have been able to identify the format in later fragments without access to the persisted state, and thus may utilize a more efficient chunking format(s) associated with tracked format(s). Although examples are described herein in relation to deduplication, examples described herein may also be utilized to perform chunking for other purposes.

Referring now to the drawings, FIG. 1 is a block diagram of an example computing environment including a computing system 100 to store a format tracking state of a format-aware filter in a backup system 200. In the example of FIG. 1, computing system 100 may be implemented by at least one computing device, which may include at least one physical network interface for communication on a computer network. Computing system 100 may include at least one processing resource 110, and at least one machine-readable storage medium 120 comprising (e.g., encoded with) instructions 121 (including instructions 122, 123, 124, 126, and 128) that are executable by the at least one processing resource 110 of computing system 100 to implement functionalities described herein in relation to FIG. 1.

In the example of FIG. 1 computing system 100 may communicate with a backup system 200. In some examples, computing system 100 may be "remote" from backup system 200, such that computing system 100 is not local to (or locally attached to) backup system 200, but instead backup system 200 is accessible to computing system 100 via a computer network such as, for example, a local area network (LAN), a virtual LAN (VLAN), a wireless local area network (WLAN), a virtual private network (VPN), the Internet, or the like, or a combination thereof.

In some examples, computing system 100 may define a data stream to be backed up to backup system 200 (which may be referred to as a "backup stream" herein), where the data stream is a collection of data accessible to the computing system 100 (e.g., locally, via a computer network, etc.). In some examples, computing system 100 may divide that stream into multiple backup images (or "fragments") for backup to backup system 200. In examples described herein, a backup image may be a discrete section of a backup stream for backup to a backup system. In the example of FIG. 1, computing system 100 may divide a backup stream (data stream) into at least a first backup image 160 and a second backup image 170 for backup (although in some examples, the data stream may be broken into a greater number of backup images or fragments).

In the example of FIG. 1, instructions 122 may access the first backup image 160 created by computing system 100, and may analyze at least a portion of the data of first backup image 160 using a plurality of format-aware filters. In examples described herein, a "format-aware filter" may be a collection of processor-executable instructions to identify data in a given format in a collection of data and track the data of the given format through a stream of data. In some examples, tracking data of a given format may include performing an initial identification of data as having the given format, and continued validation that data in a stream continues to conform to the given format. In examples described herein, a data "format" may be or define a particular manner in which data is structured when stored in a machine-readable storage medium. In some examples a particular data format may be related to a particular source of data. For example, data from a particular type of database (e.g., a particular Structured Query Language (SQL) database) may be structured with a particular format related to that type of database when stored.

In the example of FIG. 1, instructions 122 may traverse a portion of the data of first backup image 160 and analyze the data using the plurality of format-aware filters. In some examples, instructions 122 may include the format-aware filters (e.g., including format-aware filter 123, and others). When, using one of the format-aware filters, instructions 122 identify the format of a portion of the data of first backup image 160 as a format tracked by that format-aware filter, instructions 122 may continue to analyze the data of first backup image 160 with that format-aware filter until data is encountered that is of a different format (or the end of the image 160 is reached). In such examples, instructions 122 (or the format-aware filter) may be said to track the format of that portion of data. In such examples, tracking the format may include traversing the data and at least one of interpreting the data according to the format to determine what data will follow and at what location, determining whether a predetermined location in the data has been reached, and determining whether the data continues to match the tracked format.

In the example of FIG. 1, instructions 122 may identify first data, of first backup image 160, that has a first format tracked by a first format-aware filter. The first data may include headers 10 and 11 of first backup image 160. In an example, headers 10 and 11 may each be headers in a first data format that is used by a particular type of backup application (e.g., a backup application used by system 100 to create the data stream and backup images 160 and 170). In such examples, the first format-aware filter may identify and track data of the first format particular to that backup application. In some examples, the first format-aware filter may identify header 10 as a header of the first format based on identifying information particular to the first format being included in header 10 (e.g., at least one identifier at a particular location or offset within the header 10). Based on header 10, the first format-aware filter may further identify an offset (or location) within the data stream including first backup image 160 at which a next header of the format (i.e., header 11) is located. By continuing to traverse first backup image 160, instructions 122 may further determine when the offset of header 11 is reached, and parse header 11 for the offset of the next header of the first format (e.g., header 12, outside of first backup image 160). In examples described herein, information representing the format tracking state of a given format-aware filter may be referred to as a "format tracking state" for the given format-aware filter. In some examples described herein, a format tracking state may include information identifying offset or location information for later data of the tracked format, as described above in relation to headers 11 and 12. The filter state may also include any other information suitable for tracking a data format, such as a current offset in a data stream, a page size (when the data format structures the data into pages, for example), or other suitable information.

In the example of FIG. 1, when instructions 122 traversing first backup image 160 encounter header 20, instructions 122 may determine that this data is not in the first format tracked by the first format-aware filter, and begin testing the data again from header 20 with the other format aware filters. In such examples, instructions 122 may further identify second data, of first backup image 160, that has a second format tracked by a second format-aware filter 123 (different than the first format-aware filter). For example, the second data may include each of a header 20, a header 21, and data 30 of first backup image 160, each of which may be in a second format tracked by the second format-aware filter. In an example, header 20, header 21, and data 30 may each conform to a second data format used to represent data from a particular type of database (e.g., data from a particular type of SQL database). In such examples, the second format-aware filter may identify and track data of the second format particular to that type of database, including the headers 20 and 21, and data 30.

In such examples, the second format-aware filter 123 may identify and track data of the second format particular to the particular type of database. In some examples, the second format-aware filter may identify header 20 as a header of the second format based on identifying information particular to the second format in header 20 (e.g., at least one identifier at a particular location or offset within header 20). Based on header 10, second format-aware filter 123 may further identify an offset (or location) within the data stream including first backup image 160 at which a next header of the format (i.e., header 21) is located. By continuing to traverse first backup image 160, instructions 122 may further determine when the offset of header 21 is reached, parse header 21, and determine from header 21 that database data 30 begins after header 21, and determine offset of a next header of the second format (e.g., header 22 outside of first backup image 160). In such examples, at the end of header 21, the format tracking state of the second format-aware filter may include at least one of information indicating that database data begins at a particular offset in the stream (e.g., at the offset after header 21), information indicating that the database data has a particular page size (e.g., 8 k), or information indicating a particular offset at which the database data ends (e.g., the offset before header 22 later in the stream).

In some examples, the format tracking state may also include information indicating the amount of the database data in the stream following header 21. In some examples, the page size may indicate when checksums (e.g., cyclic redundancy checks (CRCs)) may be encountered by the second format-aware filter 123 in the database data (including data 30). In such examples, while traversing data 30, the second format-aware filter 123 may determine, at the end of each page, whether the checksum encountered at the end of the page is consistent with a calculated checksum of the page just traversed. If so, the second format-aware filter 123 may determine that the data continues to conform to the second format, and if not may determine that the data no longer conforms to the second format. At the end of backup image 160, the second format-aware filter 123 may have a given format tracking state 142 including information indicating at least one of an offset (or other location) of a next header (e.g., header 22), an amount of database data following header 21, an amount of the database data following header 21 that has been traversed, an offset into the stream at which the database data ends, a current offset into the stream when the end of the first backup image 160 is reached, or the like, or a combination thereof. In some examples, other information suitable for tracking a data format through a stream may be included in the format tracking state for the second format-aware filter 123.

In the example of FIG. 1, instructions 124 may chunk some or all of first backup image 160 (e.g., for deduplication). For example, instructions 124 may chunk the first data, including headers 10, using a chunking technique associated with the first format tracked by the first format-aware filter (e.g., the backup application format). As an example, when the format of the first data including headers 10 is in a format particular to first backup application, instructions 124 may chunk the first data according to an associated chunking technique of fixed block size chunking using a particular block size (i.e., splitting the data into equal sized chunks of the particular block size).

In some examples, instructions 124 may chunk the second data (including header 20, header 21, and data 30) using a chunking technique associated with the second format tracked by the second format-aware filter 123 (e.g., an SQL database format). For example, instructions 124 may chunk the second data according to an associated chunking technique of fixed block size chunking using a particular block size (e.g., 8 k) different than the block size used for the first data. In such examples, the chunking technique associated with the format tracked by the first format-aware filter may be different then the chunking technique associated with the format tracked by the second format-aware filter. In other examples, the different chunking techniques may differ in more than the fixed block size. For example, one may be fixed block size chunking, while the other may be variable block-size chunking, an alternating fixed block size chunking in which the fixed block size alternates between two values (e.g., a 20 byte block size and an 8 k block size) as the data is chunked, or any other suitable chunking technique. In examples described herein, a "chunking technique" may be at least one manner of dividing a backup image into a plurality of discrete chunks of data. In the example of FIG. 1, storage medium 120 may store a mapping of data formats to chunking techniques (e.g., in a lookup table, or the like) which may be used by instructions 124 to determine the appropriate chunking technique for a portion of data. In some examples, a chunking technique may encompass multiple manners of chunking for different types of data within a single format. For example, one manner or type of chunking may be specified for headers within a given data format, while another manner or type of chunking may be specified for non-header data within the given data format.

In the example of FIG. 1, instructions 126 may store 180, in backup system 200, a backup object 140 representing first backup image 160. In some examples, the first backup image 160 may represent backup object 140 according to the chunks formed by instructions 124, and may store 180 backup object 140 in backup system 200 after first backup image 160 is chunked, or may store 180 backup object 140 in backup system 200 progressively while chunking first backup image 160.

In some examples, the chunks formed by instructions 124 may be used for deduplication of first backup image 160. In such examples, backup object 140 may represent a deduplicated version of first backup image 160. In such examples, instructions 126 may store 180 the backup object 140 representing the deduplicated version of first backup image 160 in backup system 200. In such examples, instructions 126 may, for each chunk formed by instructions 124, obtain a chunk signature for the chunk by applying an appropriate signature function to the content of the chunk to obtain a chunk signature as a result. In some examples, the signature function may be a hash function, and the chunk signature may be a hash of the chunk generated by applying the hash function on the chunk. Any suitable hash function may be used to generate the chunk signature. In other examples, any other suitable type of signature function may be used in place of a hash function to generate an appropriate chunk signature (e.g., a function to generate a suitable type of fingerprint). In such examples, instructions 126 may provide the chunk signatures to backup system 200, which may determine whether the chunk signature represents a duplicate chunk of a chunk that is already stored in the backup system 200 or whether the chunk signature represents a new chunk to be stored in backup system 200. When the chunk signature represents a duplicate chunk, backup system 200 may provide a pointer to the copy of that chunk already stored in the backup system. When the chunk signature represent a new chunk, backup system 200 may indicate that the chunk is to be provided to the backup system 200, and backup system 200 may return to instructions 126 an pointer to the new chunk in the backup system 200 once it is stored.

In such deduplication examples, instructions 126 may form a manifest representing the first backup image 160. The manifest may include a sequential list of the chunk signatures for each of the chunks formed from first backup image 160, and may include, for each of the chunk signatures, a pointer to a location in the backup system 200 where the corresponding chunk is stored. In such examples, the backup object 140 (stored to backup system 200 by instructions 126) may include the manifest for first backup image 160, and other suitable data in some examples (e.g., compression information, chunk size information, etc.).

As described above, in the example of FIG. 1, the second format-aware filter may have a given format tracking state when it reaches the end of first backup image 160. In such examples, this given format tracking state may be the format tracking state of the second format-aware filter 123 when the first backup image has been chunked for deduplication (which may be after the second format-aware filter 123 has reached the end of first backup image 160).

In some examples, instructions 126 may store 182 the given format tracking state 142 of the second format-aware filter 123 in backup system 200, and such that it is associated with backup object 140. In some examples, instructions 126 may store 182 the given format tracking state 142 of second format-aware filter 123 as metadata of backup object 140 in backup system 200. In other examples, instructions 126 may store 182 the given format tracking state 142 associated with backup object 140 in backup system 200 in another suitable manner.

In the example of FIG. 1, after instructions 126 store backup object 140 and format tracking state 142 in backup system 200, instructions 122 may access a second backup image 170 created by computing system 100 as a second fragment of a stream of data to be backed up to backup system 200. In such examples, instructions 128 may determine whether the second backup image 170 is a potential continuation of first backup image 160 already processed. In examples described herein, a determination that a given backup image is a "potential continuation" of another backup image may be a determination that there is sufficient evidence to treat the given backup image as a candidate for being from the same backup stream as the other backup image, and containing data that immediately follows the data of the other backup image in that backup stream.

In some examples, instructions 128 may determine that second backup image 170 is a potential continuation of the first backup image based on at least one of respective temporal characteristics associated with the first and second backup images or respective identifiers associated with the first and second backup images. For example, the temporal characteristics may include a time when the backup object 140 was closed on backup system 200 (e.g., based on a command of instructions 126 to close backup object 140), and a time when second backup image 170 was created to begin the backup of second backup image 170 to backup system 200. In such examples, instructions 128 may determine that second backup image 170 is a potential continuation of first backup image 160 when backup object 140 was closed within a predetermined window of time relative to when second backup image 170 was created (e.g., within 10, seconds, 30 seconds, 1 minute, etc., of when second backup image 170 was created, or another greater or lesser time). In other examples, the time opening a backup object in backup system 200 for the second backup image 170 may be used to determine whether that time is within the predetermined window of the backup object 140 being closed, for determining whether the second backup image 170 is a potential continuation of the first backup image 160.

In some examples, as noted above, instructions 128 may determine that second backup image 170 is a potential continuation of the first backup image 160 based on respective identifiers associated with the first and second backup images. For example, the respective identifiers may be respective image names associated with the first and second backup images 160 and 170. For example, instructions 128 may determine that second backup image 170 is a potential continuation of first backup image 160 based respective image names of the first and second backup images 160 and 170 having a same prefix, and the image name for the first backup image 160 having a suffix that is incrementally lower than the image name for the second backup image 170.

For example, second backup image 170 may have an image name of "S001_012345_Vers1_Im2" and first backup image 160 may have an image name of "S001_012345_Vers1_Im1". In such examples, instructions 128 may determine that second backup image 170 is a potential continuation of first backup image 160 based on the image name for first backup image 160 having a prefix (i.e., "S001_012345_Vers1_Im") that is the same as a prefix of an image name of the second backup image 170 (i.e., "S001_012345_Vers1_Im"), and the image name for first backup image 160 having a suffix (i.e., "1") that is incrementally lower than a suffix (i.e., "2") of the image name for the second backup image 170. In some examples, instructions 128 may identify that second backup image 170 is a continuation of a prior backup image by performing a substring substitution on the image name for the second backup image to create an incrementally lower image name, and then determining whether a backup object exists in backup system 200 representing a backup image with that name. For example, backup objects may be stored in backup system 200 with the same names as the images they represent. For example, For example, when instructions 122 access second backup image 170 having an image name of "S001_012345_Vers1_Im2", instructions 128 may perform substring substitution to substitute the incrementally lower suffix "1" for the suffix "2" in the image name of second backup image 170, to create a candidate image name of "S001_012345_Vers1_Im1". Instructions 128 may then access backup system 200 to determine whether a backup object representing a backup image having an image name of "S001_012345_Vers1_Im1" is stored in backup system 200 (e.g., via names, metadata, other properties, or the like, for backup objects stored in backup system 200). As an example, instructions 128 may access backup system 200 to determine whether a backup object having the name "S001_012345_Vers1_Im1" exists in backup system 200 (i.e., in an example in which the backup object is given the same name as the image it represents). When instructions 128 identify a backup object representing a backup image having the candidate image name (e.g. backup object 140 for first backup image 160), then instructions 128 may determine that second backup image 170 is a potential continuation of the backup image that the identified backup object represented (e.g., backup image 160).

In other examples, the respective identifiers associated with the first and second backup images that instructions 128 may use to determine whether the second backup image is a potential continuation of the first backup image may include respective client identifiers associated with the first and second backup images, respective session identifiers associated with the first and second backup images, respective process identifiers associated with the first and second backup images, or other suitable identifiers. For example, each backup image created by a backup application of computing system 100 may be associated with a particular client identifier assigned to a computing device or computing system that is the source of the backup stream. In such examples, instructions 128 may compare client identifiers associated with different backup images and use the identification of matching client identifiers for different backup images as evidence that one of the backup images may be a continuation of the other.

As another example, instructions 121 may establish sessions with backup system 200 for storing backup objects in backup system 200. In such examples, each session may have an assigned session identifier, which may be a session handle or a portion of a session handle, in some examples. In such examples, backup objects stored as part of the same session between instructions 121 and backup system 200 may be associated with or linked to the same session identifier (i.e., the session identifier of that common session). In such examples, instructions 128 may compare session identifiers associated with different backup images and use the identification of matching session identifiers for different backup images as evidence that one of the backup images may be a continuation of the other.

As another example, instructions 121 may be executed using multiple different processes of computing system 100. In such examples, each process may have an assigned process identifier that identifies that process in computing system 100. In such examples, backup images processed by instructions 121 for storage as backup objects as part of the same process may be associated with or linked to the same process identifier. In such examples, instructions 128 may compare process identifiers associated with different backup images and use the identification of matching process identifiers for different backup images as evidence that one of the backup images may be a continuation of the other.

In examples described herein, instructions 128 may determine that second backup image 170 is a potential continuation of first backup image 160 based on a combination of the temporal characteristics described above and one or more of the identifiers described above, or a combination of one or more of the identifiers described above. For example, instructions 128 may determine that second backup image 170 is a potential continuation of first backup image 160 based on the temporal characteristics described above, in combination with one or more of the identifiers described above. For example, instructions 128 may identify all backup images closed within the predefined time window of the second backup image 170 being created, and then narrow the list to one or more backup images (of which the second backup is a potential continuation), based on at least one of matching client identifiers, matching session identifiers, or matching process identifiers. For example, instructions 128 may identify the second backup image 170 as a potential continuation of each other backup image for which the backup object was closed within the predetermined time window of the second backup image being created and for which the backup image is associated with the same client identifier (or process identifier, or session identifier) as the second backup image 170. In other examples, instructions 128 may use other combinations to determine one or more backup images of which the second backup image 170 is a potential continuation.

In the example of FIG. 1, in response to a determination that second backup image 170 is a potential continuation of first backup image 160, as described above, instructions 128 may access the given format tracking state 142 associated with backup object 140 in backup system 200. For example, instructions 128 may read the given format tracking state 142 from metadata of backup object 140 in backup system 200.

In such examples, instructions 122 may identify, in second backup image 170, further data of the second format tracked by the second format-aware filter 123 (i.e., data of the second "tracked format") by applying second format-aware filter 123 using the given format tracking state 142 accessed from backup system 200. In such examples, instructions 124 may chunk the identified further data of the second tracked format with a chunking technique associated with the second tracked format.

For example, after accessing the given format tracking state 142 in backup system 200, instructions 122 may attempt to continue tracking data of the second tracked format using the second format-aware filter 123 with the given format tracking state 142, prior to attempting to identify a data format in second backup image 170 using any other format-aware filter of the plurality of format-aware filters for which no format tracking state is stored in association with backup object 140.

In the example of FIG. 1, second backup image 170 begins with database data 31 of the same type as database data 30, but no related headers begin second backup image 170. As such, it may be difficult for the second format-aware filter 123 to identify database data 31 as data of the second format tracked by the format-aware filter 123 without having the given format tracking state 142, since the indicia used by format-aware filter 123 to initially identify the format may be in the headers. However, by applying second format-aware filter 123 using the given format tracking state 142, instructions 122 may determine, from information in the given format tracking state 142, that database data should continue to be seen after the end of data 30 and thus at the beginning of second backup image 170, when second backup image 170 is in fact a continuation of the first backup image 160. In such examples, instructions 122 may utilize page size information (and any other suitable information) in the given format tracking state 142 to determine how frequently checksums should be encountered in the data (e.g., after every 8 k page of data). In such examples, using the information from the given format tracking state 142, instructions 122 may validate that the expected checksums are present in database data 31 where expected based on the given format tracking state 142, and are validating the preceding page of data, and as such instructions 122 may identify data 31 as data of the second format tracked by the second format-aware filter 123. In such examples, accessing and utilizing the format tracking state stored with backup object 140 may enable instructions 122 to continue to track data of the second format in the second backup image 170, where it might otherwise have been difficult to do without the given format tracking state 142 (e.g., due to the lack of headers at the beginning of second backup image 170).

In such examples, instructions 124 may chunk database data 31 using a chunking technique associated with the second format tracked by the second format-aware filter 123 (e.g., an SQL database format). In some examples, the chunking technique may be the same chunking technique used for the database data 30 of first backup image 160. In some examples, instructions 122 may also the format-aware filter 123 may also continue to monitor an offset into the current data stream (of which the first and second backup images 160 and 170 are a part), starting from the current offset recorded in the given format tracking state 142. In such examples, instructions 122 may continue incrementing the current offset from the given format tracking state 142 while traversing and chunking the data of second backup image 170. In such examples, instructions 122 may further determine, from data in the given format tracking state 142, an offset (in the data stream) at which the next header of the second format will occur, which in the example of FIG. 1 may be the offset at which header 22 is encountered.

In such examples, instructions 122 may continue to track database data 31 while traversing second backup image 170, continue to increment the current offset from the given format tracking state 142, and determine when an offset at which header 22 is expected is reached. Instructions 122 may then continue to track headers 22 and 23 of the second format, as described above in relation to headers 20 and 21, and chunk them according to a chunking technique associated with the second data format.

In some examples, instructions 126 may store format tracking states for multiple different format-aware filters with backup object 140, as described above in relation to format tracking state 142. In such examples, instructions 128 may access each of the format tracking states associated with backup object 140 when second backup image 170 is determined to be a potential continuation of first backup image 160. In such examples, for each of the format tracking states accessed from backup system 200 in association with backup object 140, instructions 122 may apply the respective format-aware filters using the accessed format tracking states to attempt to identify the format(s) of data of second backup image 170. In the example of FIG. 1, a format tracking state of the first format-aware filter of instructions 122 may indicate an offset (in the data stream including first and second backup objects 160 and 170) at which a next header 12 of the first format is to be encountered. In such example, instructions 122 may increment the current offset from the format tracking state for the first format-aware filter to identify when header 12 is encountered. In such examples, instructions 124 may chunk the header 12 in accordance with a chunking technique associated with the first format (i.e., the format of headers 10, 11, and 12).

In examples described herein, if none of the format-aware filters having an format tracking state accessed from backup system 200 is able to identify or validate the format of particular data in the second backup image 170, then instructions 122 may default to attempting to apply all of the format-aware filters of instructions 122 to identify the format. In the example of FIG. 1, after instructions 122 have traversed all of second backup image 170, instructions 126 may store each format tracking state, as updated by the traversal of second backup image 170, in backup system 200 in association with (e.g., as metadata of) a backup object representing the second backup image 170, as described above in relation to backup object 140. The format tracking state stored with the backup object for second backup image 170 may include updated versions of each of the format tracking state accessed from backup system 200 in association with backup object 140, and format tracking state(s) for any other format-aware filter(s) which identified data format(s) during the traversal of second backup image 170.

In some examples, instructions 121 may at least partially implement a plug-in to a backup application separate from backup system 200. In some examples, the backup application may be an agent or other application, separate from backup system 200, and implemented by machine-readable instructions executable to divide a stream of data into backup images for backup on the backup system 200. In some examples, instructions 121 may at least partially implement a plug-in to such a backup application. In other embodiments, at least some embodiments described herein in relation to instructions 121 may implemented on backup system 200 (e.g., excluding embodiment(s) specific to execution of instructions 121 remote from backup system 200).

As used herein, a "computing device" may be a server, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions of medium 120 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device at least partially implementing computing system 100 may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions of medium 120 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions of medium 120 may be part of an application, applications, or component(s) already installed on a computing device of computing system 100 including processing resource 110. In such examples, the storage medium 120 may include memory such as a hard drive, solid state drive, non-volatile memory device, or the like. In some examples, functionalities described herein in relation to FIG. 1 may be provided in combination with functionalities described herein in relation to any of FIGS. 2-4.

Figure 2:
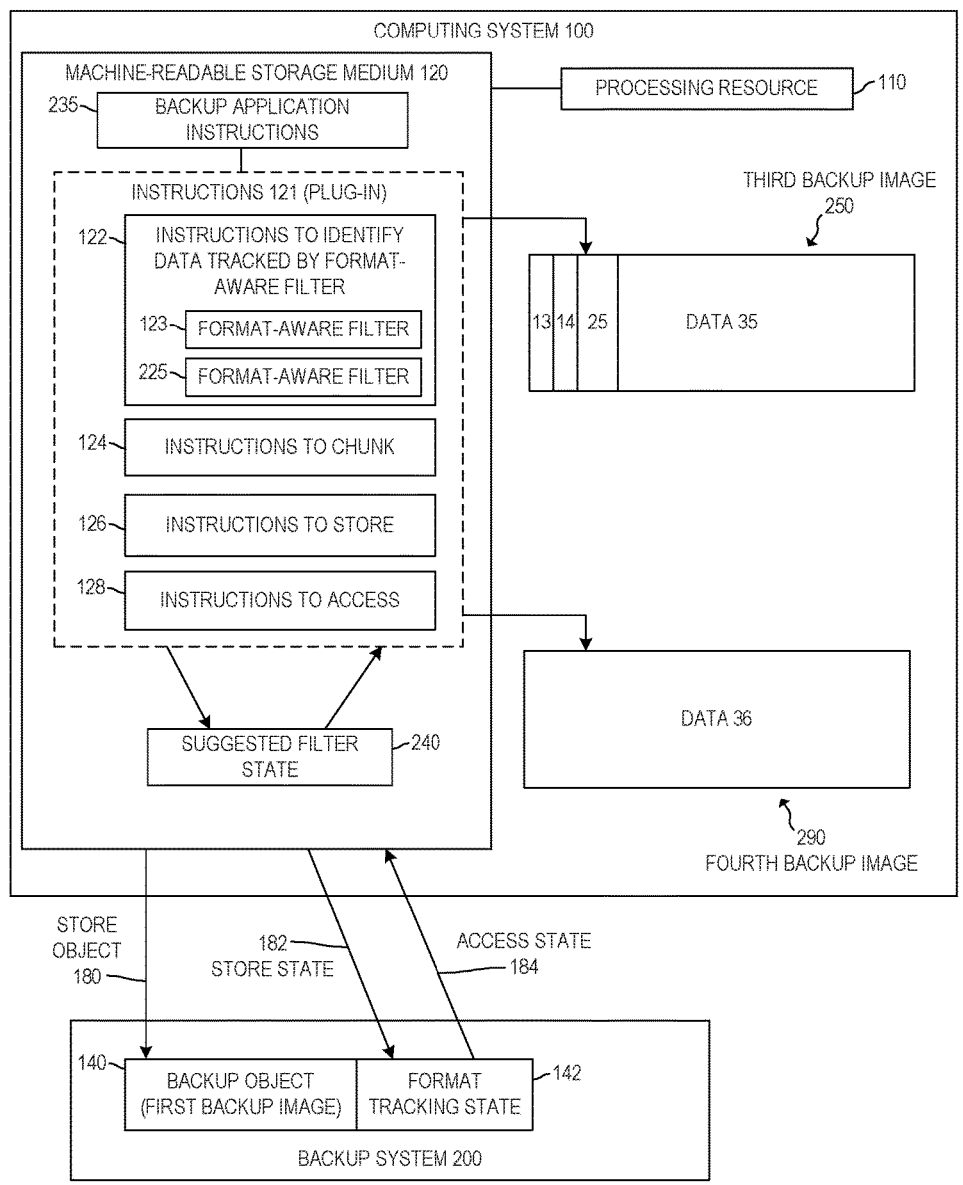
FIG. 2 is a block diagram of an example computing system to make available a suggested filter state.

FIG. 2 is a block diagram of an example computing system 100 to make available a suggested filter state 240. In the example of FIG. 2, computing system 100 may include a processing resource 110, as described above in relation to FIG. 1, and a machine-readable storage medium 120 comprising (e.g., storing) at least instructions 121, including at least instructions 122, 124, 126, and 128, as described above in relation to FIG. 1. Instructions 122, 124, 126, and 128, when executed by processing resource 110, may perform the functionalities described above in relation to instructions 122, 124, 126, and 128 in relation to FIG. 1. In the example of FIG. 2, instructions 122 may include a plurality of format-aware filters, including format-aware filter 123, as described above in relation to FIG. 1.

In the example of FIG. 2, computing system 100 may communicate with backup system 200 (which may be remote from computing system 100), as described above in relation to FIG. 1, including storing (180, 182) backup object 140 and format tracking state 142, and accessing 184 format tracking state 142, as described above in relation to FIG. 1. In addition to the functionalities described above in relation to FIG. 1, in some examples instructions 121 may be executed to perform the additional functionalities described below in relation to FIG. 2.

In the example of FIG. 2, storage medium 120 may comprise backup application instructions 235 that are executable to implement a backup application to divide a stream of data into backup images for backup on the backup system 200, as described above in relation to FIG. 1. In the example of FIG. 2, backup application instructions 235 may be executable to divide a stream of data for backup (e.g., a different stream than the stream of FIG. 1) into at least a third backup image 250 and a fourth backup image 290.

In such examples, instructions 122 may access the third backup image 250, and may analyze at least a portion of the data of third backup image 250 using a plurality of format-aware filters (e.g., of instructions 122). In the example of FIG. 2, instructions 122 may comprise an additional format-aware filter 225 (executable by processing resource 110), and instructions 122 may identify data of third backup image 250 having a third format tracked by format-aware filter 225 (e.g., header 25 and data 35 of the third format). In some examples, instructions 121 may also access and analyze fourth backup image 290 at least partially in parallel to the analysis of third backup image 250.

In such examples, instructions 128 may determine that third backup image 250 and a fourth backup image 290 are potentially from the same backup stream based on at least one of respective temporal characteristics associated with the third and fourth backup images or respective identifiers associated with third and fourth backup images 250 and 290. For example, instructions 128 determine that third and fourth backup images 250 and 290 are potentially from the same backup stream based on third and fourth backup images 250 and 290 being created within a predetermined time window relative to one another (e.g., within 10 seconds of one another, or another greater or lesser time). In examples described herein, a determination that a given backup image is a "potentially from the same backup stream" as another backup image may be a determination that there is sufficient evidence to treat the given backup image as a candidate for being from the same backup stream as the other backup image.

In some examples, instructions 128 may determine that third backup image 250 and a fourth backup image 290 are potentially from the same backup stream based on respective identifiers associated with third and fourth backup images 250 and 290. In such examples, the respective identifiers associated with third and fourth backup images 250 and 290 may include at least one of respective client identifiers for the third and fourth backup images 250 and 290, respective session identifiers for the third and fourth backup images 250 and 290, or respective process IDs for the third and fourth backup images 250 and 290, or other suitable identifiers associated with third and fourth backup images 250 and 290, respectively.

For example, instructions 128 may compare client identifiers associated with third and fourth backup images 250 and 290, and may use the identification of matching client identifiers for the third and fourth backup images 250 and 290 as evidence that the backup images are potentially from the same backup stream. In such examples, each client identifier may be a client identifier as described above in relation to FIG. 1, and may be associated with a backup image as described above in relation to FIG. 1.

As another example, instructions 128 may compare session identifiers associated with third and fourth backup images 250 and 290, and may use the identification of matching session identifiers for third and fourth backup images 250 as evidence that the backup images are potentially from the same backup stream. In such examples, each session identifier may be a session identifier as described above in relation to FIG. 1, and may be associated with a backup image as described above in relation to FIG. 1.

As another example, instructions 128 may compare process identifiers associated with third and fourth backup images 250 and 290, and may use the identification of matching process identifiers for third and fourth backup images 250 as evidence that the backup images are potentially from the same backup stream. In such examples, each process identifier may be a process identifier as described above in relation to FIG. 1, and may be associated with a backup image as described above in relation to FIG. 1.

In examples described herein, instructions 128 may determine that third and fourth backup images 250 and 290 are potentially from the same backup stream based on a combination of the temporal characteristics described above and one or more of the identifiers described above, or a combination of one or more of the identifiers described above. For example, instructions 128 may determine that third and fourth backup images 250 and 290 are potentially from the same backup stream based on the temporal characteristics described above, in combination with one or more of the identifiers described above. For example, instructions 128 may identify all backup images created within the predefined time window, and then narrow the list to one or more backup images (potentially from the same stream as the third backup image 250), based on at least one of matching client identifiers, matching session identifiers, or matching process identifiers. For example, instructions 128 may identify third backup image 250 as a potentially from the same backup stream as each other backup image created within the predetermined time window relative to third backup image 250, and being associate with the same client identifier (or process identifier, or session identifier) as third backup image 250. In other examples, instructions 128 may use other combinations to determine one or more backup images potentially from the same backup stream as third backup image 250.

In the example of FIG. 2, instructions 128 may determine that fourth backup image 290 is potentially from the same backup stream as third backup image 250, as described above. Based on this determination for third and fourth backup images 250 and 290, instructions 122 may make available, to a process to chunk the fourth backup image, a suggested format tracking state 240 of format-aware filter 225 used for third format data of third backup image 250 (e.g., header 25 and data 35). In such examples, instructions 122 may make the suggested format tracking state 240 of format-aware filter 225 available to the process to chunk the fourth backup image, via at least one of interprocess communication (IPC), a defined memory location, or a file with a defined name. For example, instructions 122 may use IPC to provide the format tracking state 240 directly to the process chunking fourth backup image 290. In other examples, computing system 100 may have at least one predefined storage area (e.g., storage region, storage address range, storage location(s), etc.) at least for storage of format tracking states, and instructions 122 may indirectly provide the format tracking state 240 to the process to chunk the fourth backup image 290 by storing the format tracking state 240 in the predetermined storage area for the process to chunk the fourth backup image 290 to retrieve at a later time. In other examples, instructions 122 may utilize at least one file with a predefined name in computing system 100 to indirectly make the format tracking state 240 available to the process to chunk the fourth backup image 290, as described for the predetermined storage area.

In the example of FIG. 2, instructions 122, executed by a process to chunk fourth backup image 290, may acquire suggested format tracking state 240. For example, instructions 122 of the process for fourth backup image 290 may receive the suggested format tracking state 240 via IPC. In other examples, instructions 122 of the process for fourth backup image 290 may acquire the suggested format tracking state 240 from predefined storage area(s) or file(s) with predetermined file name(s), as described above.

In such examples, instructions 122, executed by the process for the fourth backup image 290, may determine whether data of fourth backup image 290 has the third format tracked by format-aware filter 225, by using with format-aware filter 225 with suggested format tracking state 240. For example, the format tracking state may indicate a page size for database data, as described above, and may attempt to validate the database data format by attempting to validate checksums in data 36 at expected locations for the database data format. When instructions 122 are able to validate checksums at the expected locations in data 36, instructions 122 may determine that data of fourth backup image 290 has the third format tracked by format-aware filter 225.

In response to a determination that data of fourth backup image 290 has the third format tracked by format-aware filter 225, instructions 124 may chunk data having the third format using a chunking technique associated with the third format tracked by format-aware filter 225. The associated chunking technique may be determined as described above in relation to FIG. 1. In examples described herein, instructions 122, executed by a process to chunk third backup image 250, may also chunk data of third backup image 250 having the third format (e.g., header 25, data 35) using a chunking technique associated with the third format.

In response to a determination that at least certain data of fourth backup image 290 does not have the third format tracked by other format-aware filter 225, instructions 122 may determine whether the certain data of fourth backup image 290 has a format tracked by any of a plurality of alternative format-aware filters. In such examples, instructions 122 may default to applying many or all of the format-aware filters of instructions 122 to fourth backup image 290 when instructions 122 fail to identify the format using format-aware filter 225 using the suggested format tracking state 240.

In examples described herein, different processes may chunk different backup images at least partially in parallel. In such examples, each of these processes may be a sub-process under a parent process, where the parent process may enable a sub-process to access data associated with backup image(s) chunked by other sub-process(es), such as temporal characteristic(s), identifier(s), or a combination thereof, as described above. In other examples, multiple threads under a single parent process may chunk different backup images (rather than different processes, as described above). In such examples, the single parent process may enable a thread to access data (e.g., such as temporal characteristic(s), identifier(s), or a combination thereof) associated with backup image(s) processed by other thread(s). In such examples, the parent process may indicate, to the sub-processes or threads under it, the storage area(s) or file(s) in which the sub-processes or threads may store data they generate (e.g., format tracking state(s), temporal characteristic(s), identifier(s), or a combination thereof) and retrieve data that other process(es) or thread(s) generate (e.g., format tracking state(s), temporal characteristic(s), identifier(s), or a combination thereof). In such examples, the parent process may indicate, to the sub-processes or threads, sufficient information for the sub-processes or threads to determine and accesses the storage area(s) or file(s).

In some examples, instructions 121 may at least partially implement a plug-in to a backup application separate from backup system 200 and implemented (at least in part) by backup application instructions 235 executable to divide a backup stream data into backup images for backup on the backup system 200. In some examples, instructions 121 may at least partially implement a plug-in to such a backup application. In other embodiments, at least some embodiments described herein in relation to instructions 121 may implemented on backup system 200 (e.g., excluding embodiment(s) specific to execution of instructions 121 remote from backup system 200).

In examples described herein, the at least one processing resource 110 may fetch, decode, and execute instructions stored on storage medium 120 to perform the functionalities described above in relation to instructions stored on storage medium 120. In other examples, the functionalities of any of the instructions of storage medium 120 may be implemented in the form of electronic circuitry, in the form of executable instructions encoded on a machine-readable storage medium, or a combination thereof. In some examples, the functionalities described above in relation to instructions of medium 120 may be implemented by one or more engines which may be any combination of hardware and programming to implement the functionalities of the engine(s), as described herein. In some examples, functionalities described herein in relation to FIG. 2 may be provided in combination with functionalities described herein in relation to any of FIGS. 1 and 3-4.

Figure 3:
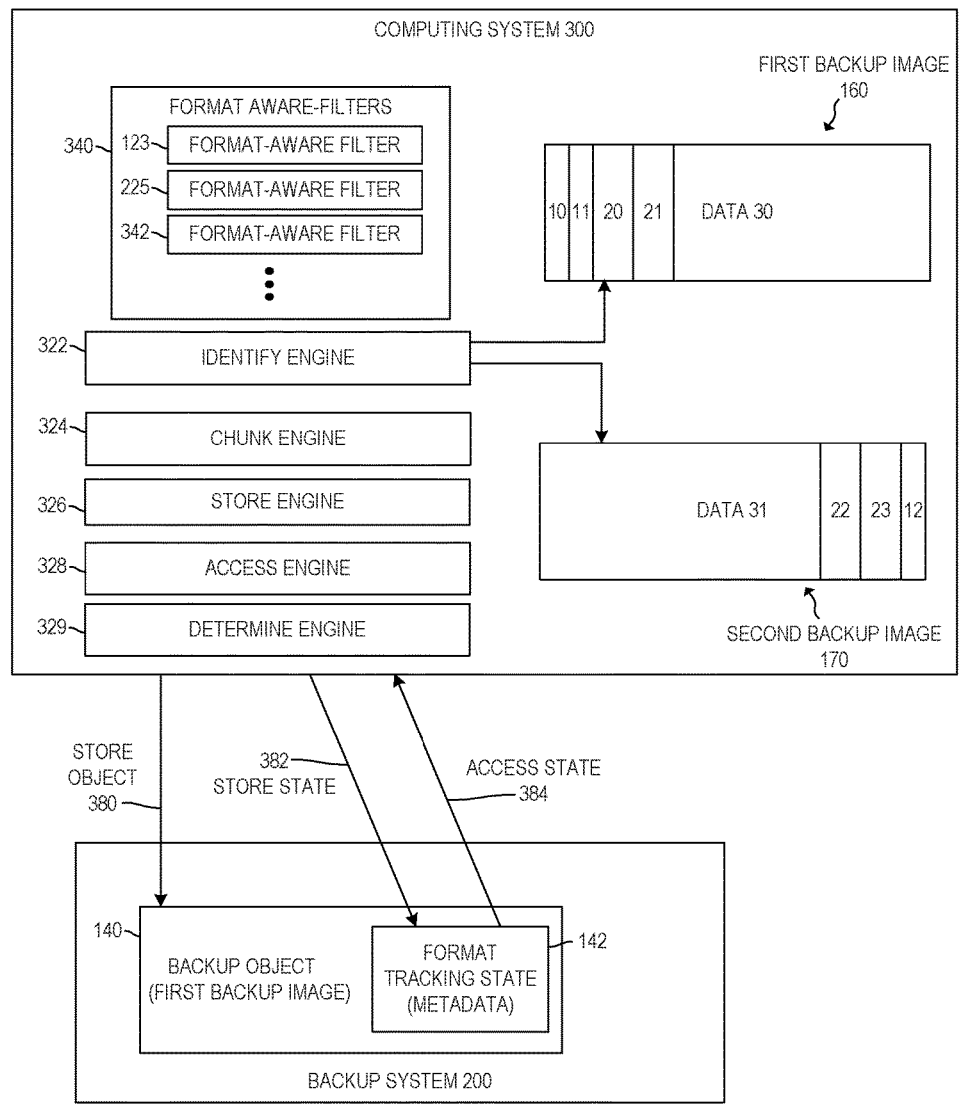
FIG. 3 is a block diagram of an example computing system to access, in a backup system, a format tracking state of a format-aware filter.

FIG. 3 is a block diagram of an example computing system 300 to access, in a backup system 200, a format tracking state 142 of a format-aware filter. In the example of FIG. 3, computing system 300 may include at least engines 322, 324, 326, 328, and 329, which may be any combination of hardware and programming to implement the functionalities of the engines, as described herein. In some examples, deduplication system 300 may be implemented on or hosted by any suitable computing system comprising at least one computing device. In examples described herein, deduplication system 300 may interact with a remote backup system 200, as described above in relation to FIG. 1.

In the example of FIG. 3, a backup application executed by computing system 300 may divide a backup stream into at least a first backup image 160 and a second backup image 170 for backup (although in some examples, the data stream may be broken into a greater number of backup images or fragments), as described above in relation to FIG. 1. The first and second backup images 160 and 170 may be the same as the first and second backup images 160 and 170 described above in relation to FIG. 1.

In the example of FIG. 3, computing system may include a plurality of format-aware filters 340, including at least format-aware filters 123 and 225 (as described above), and format-aware filter 343, each of which may be stored in at least one storage medium of computing system 300.

In some examples, identify engine 322 may traverse a portion of the data of first backup image 160 and analyze the data using the plurality of format-aware filters 340, as described above in relation to FIG. 1. In such examples, engine 322 may identify first data of first backup image 160 that has a first format tracked by a format-aware filter 342. The data identified as having the first format may include headers 10 and 11, as described above. Engine 322 may further identify second data of first backup image 160 that has a second format tracked by format-aware filter 123. The data identified as having the second format may include header 20, header 21, and data 30, as described above.

In such examples, chunk engine 324 may chunk first backup image 160 based on format tracking of a plurality of format-aware filters. For example, chunk engine 324 may chunk portions of first backup image 160 identified as having the first format (e.g., headers 10 and 11) tracked by format-aware filter 342, based on a chunking technique associated with the first format, as described above. Further, chunk engine 324 may chunk other portions of first backup image 160 identified as having the second format (e.g., headers 10 and 21, and data 30) tracked by format-aware filter 123, based on a chunking technique associated with the second format, as described above.

At the end of the traversal of first backup image 160 by identify engine 322, format-aware filter 123 may have a given format tracking state 142, as described above in relation to FIG. 1. The given format tracking state 142 may be the format tracking state 142 for format-aware filter 123 when first backup image 160 has been chunked (e.g., for deduplication), as the format tracking state 142 will be set once the traversal of first backup image 160 is complete (as chunking may be completed after or concurrently with completion of the traversal). In the example of FIG. 3, store engine 326 may store, in backup system 200, a backup object 140 representing a deduplicated version of first backup image 160, as described above. In some examples, the storage engine 326 may store the given format tracking state 142 of format-aware filter 123 as metadata of backup object 140 (e.g., store backup object 140 comprising metadata including format tracking state 142 of format-aware filter 123).

In the example of FIG. 3, a determine engine 329 may determine that second backup image 170 is a potential continuation of the first backup image based on at least one of respective temporal characteristics associated with first and second backup images 160 and 170 or respective identifiers associated with first and second backup images 160 and 170, as described above in relation to FIG. 1. In some examples, determine engine 329 may determine whether second backup image 170 is a potential continuation of first backup image 160 based on whether backup object 140 was closed within a predetermined window of time relative to when second backup image 170 was created (e.g., within 10, seconds, 30 seconds, 1 minute, etc., of when second backup image 170 was created, or another greater or lesser time), as described above in relation to FIG. 1. For example, determine engine 329 may determine that the second backup image is a potential continuation of first backup image 160 based on backup object 140 having been closed within the predetermined window of time relative to when second backup image 170 was created (e.g., within 10, seconds, 30 seconds, 1 minute, etc.).

In some examples, determine engine 329 may determine whether second backup image 170 is a potential continuation of first backup image 160 based on a comparison of the names of the first and second backup images, as described above in relation to FIG. 1. In other examples, the respective identifiers associated with first and second backup images 160 and 170 that engine 329 may use to determine whether the second backup image is a potential continuation of the first backup image may include respective client identifiers associated with the first and second backup images, respective session identifiers associated with the first and second backup images, respective process identifiers associated with the first and second backup images, or other suitable identifiers, as described above in relation to FIG. 1. In examples described herein, engine 329 may determine that second backup image 170 is a potential continuation of first backup image 160 based on a combination of the temporal characteristics described above and one or more of the identifiers described above, or a combination of one or more of the identifiers described above, as described in relation to FIG. 1.

In the example of FIG. 3, in response to a determination that second backup image 170 is a potential continuation of first backup image 160, an access engine 328 may access the format tracking state 142 in metadata of backup object 140 in backup system 200. In such examples, chunk engine 324 may identify, in second backup image 170, data of the second format tracked by format-aware filter 123, by applying format-aware filter 123 using the format tracking state 142 accessed from the metadata of backup object 140, as described above in relation to FIG. 1. In such examples, chunk engine 324 may chunk the identified data of the second format with a chunking technique associated with the tracked second format, as described above in relation to FIG. 1.

As described above, computing system 300 may include at least engines 322, 324, 326, 328, and 329, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine of computing system 300. In some examples, the at least one machine-readable storage medium may store instructions that, when executed by the at least one processing resource, at least partially implement some or all engines of computing system 300. In such examples, computing system 300 may include the at least one machine-readable storage medium storing the instructions and the at least one processing resource to execute the instructions. In other examples, the functionalities of any engines of computing system 300 may be at least partially implemented in the form of electronic circuitry. In some examples, functionalities described herein in relation to FIG. 3 may be provided in combination with functionalities described herein in relation to any of FIGS. 1, 2, and 4.

Figure 4:
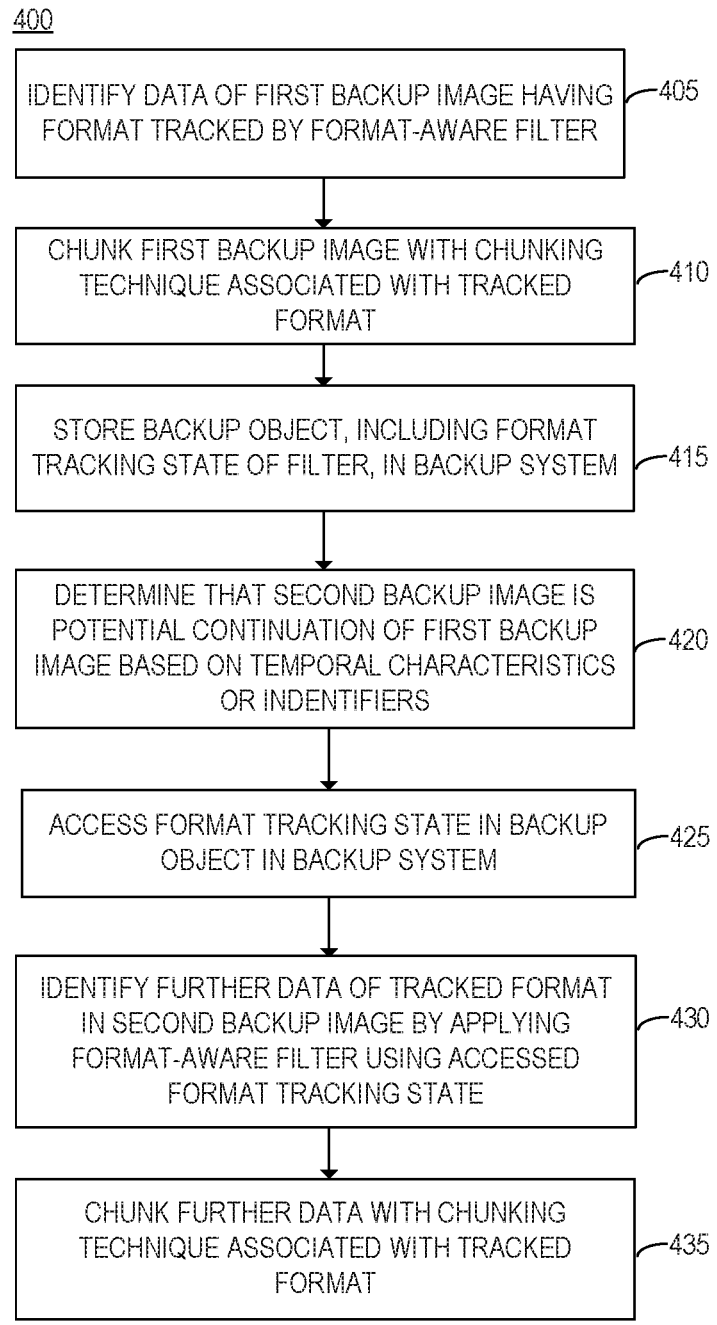
FIG. 4 is a flowchart of an example method of a computing system including determining that a second backup image is a potential continuation of a first backup image.

FIG. 4 is a flowchart of an example method 400 of a computing system 100 including determining that a second backup image is a potential continuation of a first backup image. Although execution of method 400 is described below with reference to computing system 100 of FIG. 1, other suitable systems for the execution of method 400 may be utilized (e.g., computing system 300 of FIG. 3). Additionally, implementation of method 400 is not limited to such examples.

In the example of FIG. 4, method 400 may be performed by computing system 100 remote from a backup system (e.g., backup system 200). At 405 of method 400, instructions 122 of computing system 100 may identify, with a format-aware filter 123 of computing system 100, given data of a first backup image 160 having a format tracked by format-aware filter 123, as described above. For example, the given data may include headers 20 and 21, and data 30. At 410, instructions 124 may chunk the given data of first backup image 160 with a chunking technique associated with the tracked format. In such examples, the format-aware filter 123 may have a given format tracking state 142 when the first backup image has been chunked for deduplication, as described above in relation to FIG. 3.

At 415, instructions 126 may storing backup object 140 in backup system 200, the backup object 140 representing a deduplicated version of first backup image 160 and including the given format tracking state 142. In some examples, the storing at 415 may include storing the given format tracking state 142 as metadata of backup object 140 stored in backup system 200. At 420, instructions 128 may determine that a second backup image 170, separate from first backup image 160, is a potential continuation of first backup image 160, based on at least one of temporal characteristics or identifiers associated with first backup image 160 and second backup image 170, respectively, as described above in relation to FIG. 1.

At 425, in response to the determination that second backup image 170 is a potential continuation of first backup image 160, instructions 128 may access the given format tracking state 142 in backup object 140 in backup system 200, as described above. At 430, by applying the given format-aware filter 123 using the given format tracking state 142 accessed from backup system 200, instructions 122 may identify, in the second backup image 170, further data of the given format tracked by the format-aware filter 123. At 345, instructions 124 may chunk the identified further data with the chunking technique associated with the tracked format (i.e., the data format tracked by format-aware filter 123), as described above in relation to FIG. 1.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource to:

identify given data, of a first backup image, having a format tracked by a format-aware filter;

store, in a backup system, a backup object representing the first backup image, the format-aware filter having a given format tracking state when the first backup image has been chunked for deduplication;

store the given format tracking state of the format-aware filter in the backup system and associated with the backup object;

in response to a determination that a second backup image is a potential continuation of the first backup image, access the given format tracking state associated with the backup object in the backup system;

identify further data of the tracked format, in the second backup image, by applying the given format-aware filter using the given format tracking state accessed from the backup system; and chunk the identified further data with a chunking technique associated with the tracked format.

2. The article of claim 1, wherein the instructions comprise instructions to:

store the given format tracking state of the format-aware filter as metadata of the backup object in the backup system.

3. The article of claim 1, wherein the instructions comprise instructions to:

determine that the second backup image is a potential continuation of the first backup image based on at least one of respective temporal characteristics associated with the first and second backup images or respective identifiers associated with the first and second backup images.

4. The article of claim 1, wherein the instructions comprise instructions to:

identify data of a third backup image having a format tracked by another format-aware filter;

determine that the third backup image and a fourth backup image are potentially from the same backup stream based on at least one of respective temporal characteristics associated with the third and fourth backup images or respective identifiers associated with the third and fourth backup images; and based on the determination for the third and fourth backup images, make available, to a process to chunk the fourth backup image, a suggested format tracking state of the other format-aware filter.

5. The article of claim 4, wherein the instructions comprise instructions to:

acquire the suggested format tracking state;

determine, with the other format-aware filter using the suggested format tracking state, whether certain data of the fourth backup image has the format tracked by the other format-aware filter;

in response to a determination that the certain data has the format tracked by the other format-aware filter, chunk the certain data using another chunking technique associated with the format tracked by the other format-aware filter; and in response to a determination that the certain data does not have the format tracked by the other format-aware filter, determine whether the certain data of the fourth backup image has a format tracked by any of a plurality of alternative format-aware filters.

6. The article of claim 4, wherein the instructions to make available the suggested format tracking state comprise instructions to:
   make available the suggested format tracking state of the other format-aware filter to the process to chunk the fourth backup image via at least one of interprocess communication (IPC), a defined storage area, or a file with a defined name.

7. The article of claim 5, wherein the respective identifiers associated with the third and fourth backup images include at least one of respective client identifiers, respective session identifiers, or respective process IDs associated with the third and fourth backup images.

8. The article of claim 5, wherein the instructions comprise instructions to:
   determine that the third and fourth backup images are potentially from the same backup stream based on the third and fourth backup images being created within a given time window.

9. The article of claim 1, wherein the instructions at least partially implement a plug-in to a backup application separate from the backup system.

10. A system comprising:
    a chunk engine to chunk a first backup image based on format tracking of a plurality of format-aware filters, one of the format-aware filters having a given format tracking state when the first backup image has been chunked for deduplication;
    a store engine to store, in a backup system, a backup object representing a deduplicated version of the first backup image, the backup object comprising metadata including the given format tracking state of the one format-aware filter; and
    an access engine to access the given format tracking state in the metadata of the backup object in the backup system, in response to a determination that a second backup image is a potential continuation of the first backup image;
    wherein the chunk engine is further to identify data of a tracked format, in the second backup image, by applying the one format-aware filter using the given format tracking state accessed from the metadata of the backup object; and
    wherein the chunk engine is further to chunk the identified further data with a chunking technique associated with the tracked format.

11. The system of claim 10, further comprising:
    a determine engine to determine that the second backup image is a potential continuation of the first backup image based on at least one of respective temporal characteristics associated with the first and second backup images or respective identifiers associated with the first and second backup images.

12. The system of claim 11, wherein the determine engine is further to determine whether the second backup image is a potential continuation of the first backup image based on the backup object having been closed within a predetermined window of time relative to when the second backup image was created.

13. The system of claim 11, wherein the determine engine is further to determine whether the second backup image is a potential continuation of the first backup image based on a comparison of the names of the first and second backup images.

14. A method comprising:
    identifying, with a format-aware filter of a computing system, given data of a first backup image having a format tracked by the format-aware filter;
    chunking the given data of the first backup image with a chunking technique associated with the tracked format, wherein the given format-aware filter has a given format tracking state when the first backup image has been chunked for deduplication;
    storing a backup object in a backup system, the backup object representing a deduplicated version of the first backup image and including the given format tracking state;
    determining that a second backup image, separate from the first backup image, is a potential continuation of the first backup image, based on at least one of temporal characteristics or identifiers associated with the first backup image and the second backup image, respectively;
    in response to the determination, accessing the given format tracking state in the backup object in the backup system;
    identifying further data of the given format in the second backup image by applying the given format-aware filter using the given format tracking state accessed from the backup system; and
    chunking the identified further data with the chunking technique associated with the tracked format.

15. The method of claim 14, wherein the storing comprises:
    storing the given format tracking state as metadata of the backup object stored in the backup system.

* * * * *